Oct. 25, 1932.  F. TYSON  1,884,395

ROLLER BEARING

Filed Sept. 8, 1930

Inventor

Frank Tyson

By Frease and Bishop
Attorneys

Patented Oct. 25, 1932

1,884,395

UNITED STATES PATENT OFFICE

FRANK TYSON, OF CANTON, OHIO

ROLLER BEARING

Application filed September 8, 1930. Serial No. 480,383.

The invention relates particularly to taper bearings, and more especially to an improved construction of cup for such bearings.

In the practical application of taper roller bearings it is customary practice to fix the cone upon a shaft or axle and to drive fit the cup into a socket, of slightly less diameter than the cup; said socket being formed in a hub or other element having a relative rotary movement with respect to the shaft.

By thus driving the cup into an opening of less diameter, the inner or bearing surface of the cup is distorted sufficiently to prevent the rollers from bearing on the entire surface thereof.

An important object of the present improvement is to provide a roller bearing having a cup peripherally grooved at spaced points, in order to produce a certain amount of flexibility in the cup whereby the same may be driven into a socket or opening of less diameter without distorting the inner or bearing surface of the cup.

Another principal object of the invention is to provide a uniform texture of metal in the hardening process throughout that portion of the cup contained within a line drawn parallel to the bearing surface of the cup from its periphery at its smaller end, or at the end of its greatest diameter of opening.

Another object is to provide these grooves of such size and relative spacing that the cup is substantially divided thereby into a plurality of joined rings each of substantially the same cross sectional area.

A further object of the improvement is to provide a novel locking device for rigidly connecting the retaining ring to the cone, in order to hold the rollers in assembled condition upon the cone, when the cup is removed therefrom.

Figure 1:
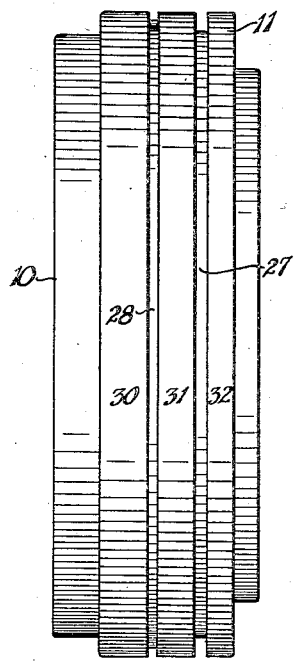
Figure 2:
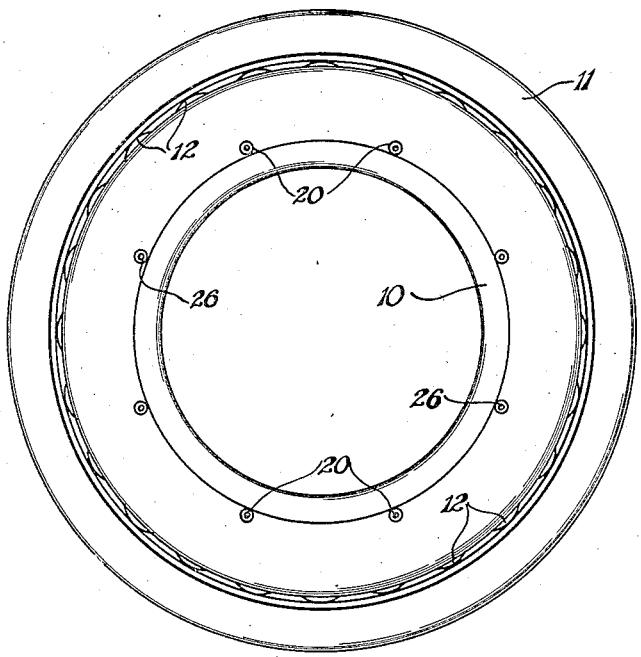
Figure 4:
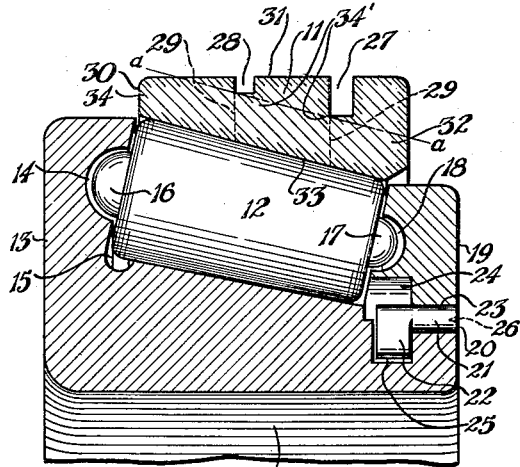
Figure 3:
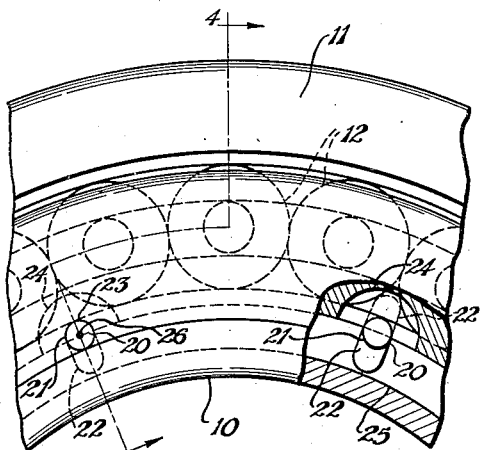

The above and other objects, apparent from an inspection of the accompanying drawing, and from the following detail description, may be attained by constructing the improved bearing in the manner illustrated in the drawing, in which Figure 1 is an edge elevation of the peripherally grooved cup forming a part of the invention;

Fig. 2, an elevation of the improved bearing;

Fig. 3, an enlarged, fragmentary elevation of a part of the bearing, illustrating the locking device for the retaining ring;

Fig. 4, a section on the line 4—4, Fig. 3, and

Figure 5:
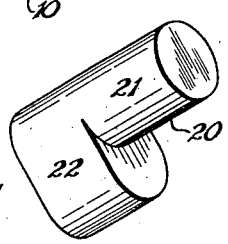

Fig. 5, a detached perspective view of one of the ring locking devices.

Similar numerals refer to similar parts throughout the drawing.

The bearing comprises generally the cone 10 and cup 11, having outer and inner bearing surfaces respectively, between and upon which the taper rollers 12 are mounted for rotation.

A thrust or abutment flange 13 is rigidly connected to, or formed integrally with the larger end of the cone 10, and may be provided with an annular groove 14 in the reentrant, or hollow cone thrust surface 15 thereof, to receive the pintles 16 at the larger ends of the rollers.

Pintles 17 may also be formed upon the smaller ends of the rollers, for engagement in the annular groove 18 of the retaining ring 19. The rollers are thus retained in assembled condition upon the cone, when the cup is removed therefrom.

For the purpose of rigidly connecting the retaining ring to the cone, a plurality of locking devices 20 are provided, each having an axial shank portion 21 and an eccentric head 22 at its inner end.

The inner annular edge of the retaining ring is provided with spaced openings 23, adapted to receive the shank portions 21 of the locking devices, and pockets 24 are formed in the interior side of the ring, to permit the locking devices to be rotated upon their axes so that the eccentric heads 22 thereof may be received in the pockets, as shown in dotted lines in Fig. 3, in order that the ring with the locking devices therein, may be positioned upon the smaller end of the cone.

The shanks of the locking devices are then rotated, by means of a suitable tool, until the eccentric heads 22 thereof, are engaged in the annular groove 25 of the cone, as shown in Figs. 3 and 4, after which the end of each shank 21 is upset, as by a center punch, or the like, in the manner shown at 26.

The construction of the cup 11, is a very important feature of the invention and consists generally in the provision of peripheral grooves 27 and 28 in the outer cylindric surface of the cup, which divide the cup into three ring portions, indicated by the dotted lines 29 in Figure 4, the ring portions indicated at 30, 31 and 32 being of substantially equal cross sectional area.

The groove 27 is deeper and may be wider, than the groove 28 so that a line, as indicated at $a$—$a$ drawn through the inner sides of the two grooves and from the peripheral edge of the smaller end of the cup, will be substantially parallel to the conical bearing surface 33 of the cup, the grooves being of different depths, so that the bottoms thereof are substantially equidistant from the inner conical bearing surface of the cup.

By this construction the cup is sufficiently flexible to permit the same to be driven into a socket slightly smaller in diameter than the outside diameter of the cup without distorting the inner bearing surface 33, whereby the rollers 12, will have rolling contact with the cup throughout their lengths.

It will also be seen that when this cup is heat treated a hardened skin as indicated at 34, is formed not only around the entire outer surfaces of the cup but around the surfaces of the grooves 27 and 28 as indicated at 34', thus providing hardened surfaces in the line $a$—$a$ at points appreciably closer to the bearing surface 33 of the cup than is possible under ordinary practice where the usual solid cup is used.

I claim:
1. A taper roller bearing including a cone having an outer raceway surface, a cup having an outer cylindric surface and a conical inner raceway surface and a plurality of rollers rolling on and between the raceway surfaces, the cup being provided with spaced peripheral grooves of different depths with bottoms substantially equidistant from the conical raceway surface.

2. A taper roller bearing including a cone having an outer raceway surface, a cup having an inner raceway surface and a plurality of rollers rolling on and between the raceway surfaces, the cup being provided with spaced peripheral grooves increasing in depth toward the larger end of the cup.

3. A taper roller bearing including a cone having an outer raceway surface, a cup having an inner raceway surface and a plurality of rollers rolling on and between the raceway surfaces, the cup being provided with spaced peripheral grooves increasing in depth and width toward the larger end of the cup.

4. A taper roller bearing including a cone having an outer raceway surface, a cup having an inner raceway surface and a plurality of rollers rolling on and between the raceway surfaces, the cup being provided with spaced peripheral grooves dividing the cup into a plurality of joined rings of substantially equal cross sectional area.

5. A taper roller bearing including a cone having an outer raceway surface, a cup having an inner raceway surface and a plurality of rollers rolling on and between the raceway surfaces, a thrust flange rigidly connected to one end of the cone, a retaining ring at the inner end of the cone and locking members having axial shanks carried by the ring and provided with eccentric heads, the cone having a peripheral groove to receive said heads.

6. A taper roller bearing including a cone having an outer raceway surface, a cup having an inner raceway surface and a plurality of rollers rolling on and between the raceway surfaces, a thrust flange rigidly connected to one end of the cone, a retaining ring at the inner end of the cone and locking members having axial shanks carried by the ring and provided with eccentric heads, the cone having a peripheral groove to receive said heads and means for holding the locking members in locked position.

In testimony that I claim the above I have hereunto subscribed my name.

FRANK TYSON.